May 21, 1957 F. BASTIE 2,792,956
INDUSTRIAL LIFT TRUCK WITH BODILY SHIFTABLE UPRIGHT
GUIDES AND MINIMUM LOAD OVERHANG
Filed Nov. 19, 1954 3 Sheets-Sheet 1

INVENTOR
FRANCISQUE BASTIE
BY
ATTORNEY

May 21, 1957
F. BASTIE
2,792,956
INDUSTRIAL LIFT TRUCK WITH BODILY SHIFTABLE UPRIGHT
GUIDES AND MINIMUM LOAD OVERHANG
Filed Nov. 19, 1954
3 Sheets-Sheet 2
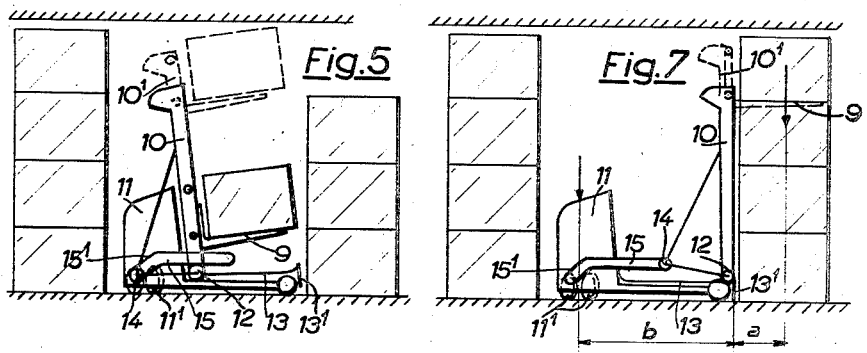
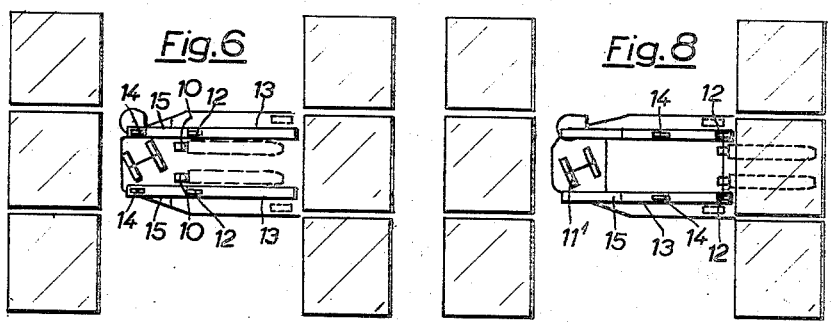
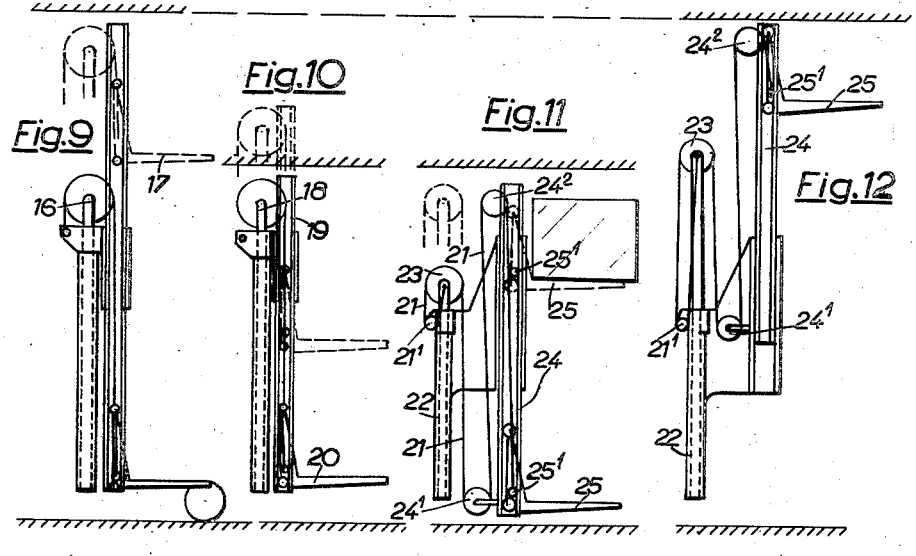
INVENTOR
FRANCISQUE BASTIE
BY
ATTORNEY May 21, 1957 F. BASTIE 2,792,956
INDUSTRIAL LIFT TRUCK WITH BODILY SHIFTABLE UPRIGHT
GUIDES AND MINIMUM LOAD OVERHANG
Filed Nov. 19, 1954 3 Sheets-Sheet 3

INVENTOR
FRANCISQUE BASTIE

BY J. Delattre-Seguy

ATTORNEY

United States Patent Office 2,792,956
Patented May 21, 1957

2,792,956

INDUSTRIAL LIFT TRUCK WITH BODILY SHIFTABLE UPRIGHT GUIDES AND MINIMUM LOAD OVERHANG

Francisque Bastie, Aurec, France

Application November 19, 1954, Serial No. 470,070

Claims priority, application France December 3, 1953

7 Claims. (Cl. 214—672)

The lifting and conveying trucks proposed hitherto are generally of two types as concerns the arrangement of the carrier lifting section adapted to raise goods above the actual truck.

In the first type illustrated diagrammatically in Figs. 1 and 2 of accompanying drawings, the goods carrying and lifting platform is shown at 1 together with the uprights 2 which serve as guides and supports for the said platform with reference to the sets of steering wheels 3 and of front carrier wheels 4. Thus, the load is properly distributed between the axles and the stability is excellent. The design of the arrangement may be lighter than in convention cases and this leads to a reduction of the power required for driving the truck and, furthermore, the latter may be given a comparatively small length which allows it to pass in the narrow passages provided between stacked packages as illustrated in the drawings.

In contradistinction, the said type of truck shows various drawbacks:

The small front wheels 4 abut against the packages already positioned and prevent the direct laying of the conveyed packages over those which have already been stacked;

It is impossible to remove the packages from ground as well as the small plates which serve for handling loose goods. It is, therefore, necessary to lay the packages or goods directly on the lifting carrier, which leads to a lowering of the level of platform carrier 1 with reference to ground into its lowermost position and consequently, it is necessary to resort to small diameter front wheels 4 so that the latter are speedily worn and are objectionable when moving over uneven ground;

Lastly, as shown in Fig. 1, in which the hatched section 5 illustrates the low ceiling of a goods van for instance, the guiding uprights 2 for these trucks are given generally a predetermined height corresponding to premises of average height whereby it is impossible to provide for stacking indifferently in premises with a considerable height underneath their ceiling and in goods vans.

In the second known type of lifting and conveying trucks illustrated in Figs. 3 and 4 of accompanying drawings, the lifting fork 6 for the package is carried by and guided along the masts 7, the arrangement extending in over-hanging relationship to the front of the truck and of the wheel axle 8 of the latter.

With such an arrangement, it is apparent that it is possible to remove directly all the packages or goods, which allow the introduction of the lifting forks 6 underneath same. It is also possible to stack the packages directly over one another without any further handling. Generally speaking, the truck of this type moves translationally under the control of the front axle, which provides optimum adherence.

However, this type of carriage shows the important following drawbacks:

Its length is too considerable and this increases the breadth of the passages between the stacked packages and reduces consequently in the same proportion the storing capacity of the warehouses and workshops;

The load is carried in overhanging relationship with reference to the axle of the front wheel 8, which leads to using a heavier truck and requires, in fact, the use of ballast with a view to securing a proper balance;

The wheels 8 and the floor boards are submitted to an abnormal overload during the loading of the truck, which requires giving the tyres for said wheels a large diameter and this increases again the overhanging of the structure and the size of the mechanism controlling the translational movement of the truck;

It is necessary to shift the dead weight as much as possible towards the rear and this reduces the adherence of the front wheels 8 when the truck is empty;

It is necessary to use a large driving unit by reason of the considerable weight of the arrangement;

The stability may sometimes be unreliable if a load of considerable weight is positioned in a somewhat eccentric manner on the lifting carrier forks 6;

Lastly, in most cases, the telescopic guiding parts 7 of the truck do not allow stacking both in goods vans and in premises having a low ceiling and also in warehouses of a greater height. As illustrated in Fig. 3 in interrupted lines, the telescopic mast 7 engages the low ceiling before the carrier forks 6 have reached a sufficient height. Generally, it is necessary to provide short guides for low ceilings.

The improvements according to the invention are obtained through a novel design and imply a very special execution as will appear from the following description, reference being made to accompanying drawings. This allows cutting out the above-mentioned drawbacks of the prior types of trucks, the advantages and properties to be provided by such trucks being thus associated so as to obtain a service which is both the best and the cheapest.

In order to properly define the object of my invention without however limiting it, accompanying drawings show:

In Figs. 1 and 2, diagrammatic views respectively in elevation and in plan of the first prior type of truck.

Figs. 5 and 6 and Figs. 7 and 8 are four diagrammatic, respectively elevational and plan views of my improved truck in two different stages of operation.

Figs. 9 and 10 illustrate diagrammatically two different conventional types of lifting means for conveying trucks. The lines drawn in interrupted lines illustrate the position of said lifting means after the lifting operation.

Figs. 11 and 12 are diagrammatic views of the lifting means according to my invention in two successive stages of operation, the interrupted lines drawn in Fig. 11 illustrating the position assumed after a first shifting.

Figure 1:
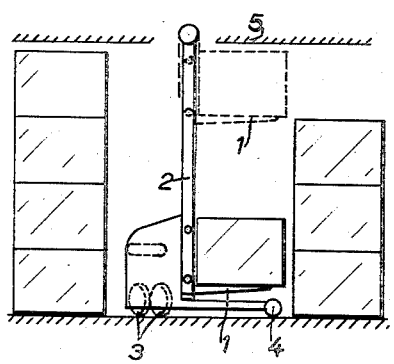
Figure 3:
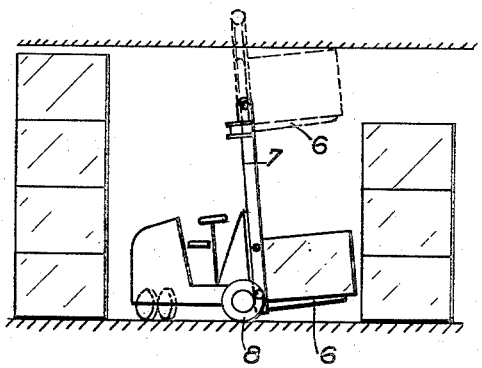
Figs. 3 and 4 are similarly an elevational and a plan view of the second prior type of truck.
Figure 2:
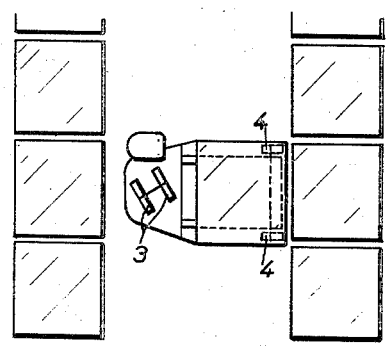

According to my invention, the lifting means includes lifting forks 9 (or a lifting platform) and the telescopic uprights or guiding masts $10$—$10^1$ for said forks and it is movably carried by the actual conveying truck 11 with which it forms a unit. Said actual truck has the form of a U in its front lower section so as to further the operation of the lifting means. The rear wheel axle $11^1$ of the truck forms both the driving and steering axle.

The movable securing of the lifting means on the truck is performed through bearing points on which said lifting means are adapted to move, the truck being further provided with suitable slopes and a guiding runway.

The first bearing point is constituted by the rollers 12 mounted in the plane of the uprights 10 and at the lower ends of the latter.

The rollers 12 run over the slopes 13 which are provided at their front end at 13¹ with a prop engaging the ground. Said slopes 13 are carried by the truck and are adapted to pivot with reference thereto so that when the guiding uprights 10 are shifted back over the truck as illustrated in Figs. 5 and 6, said slopes 13 pivot and the props 13¹ are raised whereas when the guiding uprights are shifted forwardly as shown in Figs. 7 and 8, the props engage the ground.

The second bearing point is constituted by the rollers 14 located to the rear of the guiding uprights 10 at a level higher than the rollers 12. The connection between the rollers 14 and the guiding uprights 10 and associated rollers 12 is shown diagrammatically in the drawing. The rollers 14 run over the guideways 15 rigid with the actual truck and provided at the rear with a slope 15¹. Thus, when the lifting means have been shifted rearwardly into the position illustrated in Figs. 5 and 6, the slopes 15¹ produce a stabilizing rocking of the lifting means and of their load towards the rear so as to further transportation.

The rearward shifting of the lifting means for transportation purposes produces, in addition to the pivotal movement of the slopes 13 already referred to, a release which is obtained through any suitable means, in association with the pivoting movement of said slopes 13, for instance, whereby the means controlling the movement of the truck are ready for operation. Thus the truck may be translationally moved only when the lifting means are in their transportation position.

It will be remarked as illustrated in Fig. 7 that the lever arm $a$ of the load is very small with reference to the lever arm $b$ of the equilibrating force constituted by the weight of the truck, the two lever arms being defined with reference to the prop 13¹ engaging ground.

The lifting means on the truck illustrated in Figs. 5 and 7 include stationary guides 10 inside which are slidingly carried movable guide sections 10¹; the carrier including the lifting forks 9 is adapted to move along the guiding sections 10¹, after which the latter are raised in their turn. It is thus possible to stack inside premises of any type and in particular in goods vans having a low ceiling.

From the preceding disclosure and reference being made to the figures of the drawings, it is apparent that the length of the truck is small and yet it is possible to lift the packages from ground and to stack them directly in position; the truck has a perfect stability and a reduced weight and its safety means prevents any undesired shifting, and lastly its telescopic mounting provides a great adaptability of use in whatever premises it is used.

Figs. 9 and 10 of accompanying drawings illustrate diagrammatically two prior known types of lifting means for trucks.

The arrangement illustrated in Fig. 9 is of the type including a stationary upright the height of which should suit the premises to be served. In this arrangement, the head of the jack 16, when raised, raises the forked carrier 17 which, by reason of its connection with a pulley block, rises twice more quickly.

The arrangement of Fig. 10 is of a conventional type including telescopic uprights. This arrangement does not allow stacking inside premises having a low ceiling. In the said arrangement, the head of the jack 18 is connected with a movable guide 19 which rises immediately at a speed which is reduced by one half. The maximum height is obtained when the fork carrier 20 has reached the level of the movable head 18. It will be easily ascertained from inspection of the drawing that this arrangement is not adapted for use inside premises having a low ceiling, as evidenced by the showing in interrupted lines.

According to an arrangement falling within the scope of my invention, a cable 21 is attached to the spindle carrying the pulley 23 at the head of the telescopic section of the stationary jack 22 (Fig. 11). Said cable 21 passes over the pulley 21¹ rigid with the stationary body of the jack 22 and then over said pulley 23 at the head of the telescopic section of the jack after which the cable is wound over the pulley 24¹ mounted at the lower end of a separate sliding guiding member 24 for the carrier 25 and thence it extends over the pulley 24² at the head of the movable guiding member 24 so as to terminate at the point 25¹ where it is attached to the forked carrier 25 adapted to move alongside of the movable guide 24. It will be remarked that the cable is connected with the jack through three strands and acts directly on the stacking means and consequently, the travel of the head of the jack 23 is always equal to one third of the travel executed by the carrier 25. The use of such a mounting of the cable allows the head of the jack to remain underneath the upper level of the stationary guiding members when the stacking is performed in low premises.

This same mounting provides, as soon as the head 23 of the jack begins its rising movement, a traction of the forked carrier 25 which rises until it reaches the upper end of the movable guiding member 24 where it stops, as shown in interrupted lines in Fig. 11. When the jack continues acting, it raises together the guiding member 24 and the forked carrier 25 into the position illustrated in Fig. 12.

It is apparent that the height of the collapsed lifting means, as shown in Fig. 11, corresponds to the lowest doors that may be used, such as those of goods vans for instance, and it is possible to provide for the stacking inside premises having a low ceiling and also at a greater height, as allowed by the expansion of the movable guiding member 24.

Figure 13:
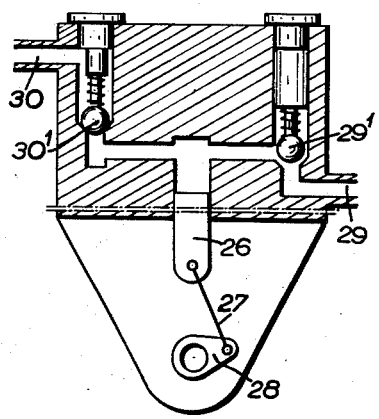
Fig. 13 is a diagrammatic view of an oil pump of a conventional type adapted to move the jacks of the lifting trucks.

The invention also covers a novel arrangement of oil-operated pumps for the control of the jacks. Previous to disclosing this arrangement, it should be mentioned that the oil pumps controlling the jacks serve only for raising loads, while the downward movement is generally performed by opening a valve connecting directly the jack body with the oil container. This leads to a sudden downward movement of the packages which may lead to their damaging. Arrangements have already been proposed with a view to cutting out this drawback, but they are intricate and expensive. Fig. 13 illustrates an oil pump of a conventional type for the control of jacks. It includes a piston 26 connected through a connecting rod 27 with a crankshaft 28. The pipes 29 and 30 serving for the inlet and outlet of the oil are normally closed by ball valves such as 29¹ and 30¹ urged against their seats by corresponding springs. The operation is obvious and each rotation of the crankshaft produces a suction of the oil inside the cylinder containing the piston 26 through the pipe 29, the said suction step being followed by a delivery step of the oil towards the jack through the pipe 30.

Figure 14:
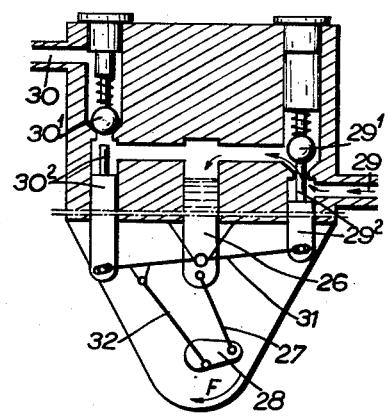
Figs. 14, 15 and 16 are diagrammatic views illustrating diagrammatically successive stages of operation of a pump executed in accordance with my invention.

According to my invention and as illustrated in Fig. 14, it is possible to use the same parts as precedingly with the addition of means controlling the valves 29¹ and 30¹ by pusher member 29² and 30² respectively, the said pusher members being connected by a rocker beam 31 and controlled by a connecting rod 32 pivotally connected to the said rocker beam 31 and to the crankshaft 28 with a predetermined eccentricity.

Figure 4:
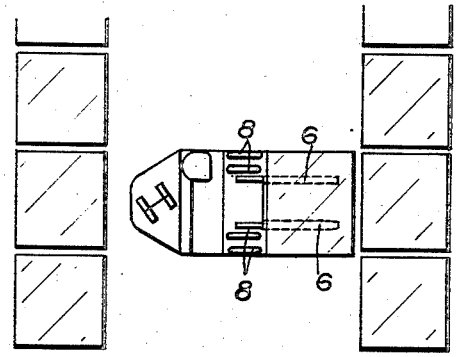

Through this arrangement, the piston 26 is drawn downwardly during a fraction of the rotation of the crankshaft driving the pump in the direction of the arrow F shown in Fig. 4. At the same time and by reason of the operation of the connecting rod 32 and of the rocker beam 31, the pusher member 29² acts against the ball valve 29¹ on the suction side. Said valve is thus raised positively during the suction stroke and there is no risk of its opening with a delay. The cylinder is thus filled completely and speedily as shown in Fig. 14.

Figure 15:
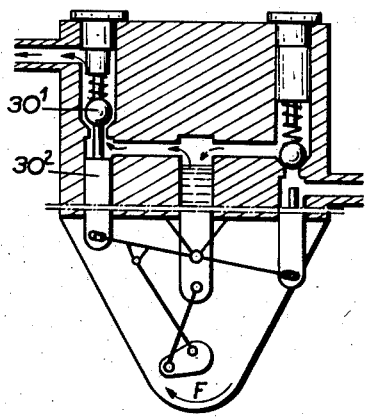

During the following fraction of the rotation of the crankshaft, the oil is urged back by the piston and at the same time the pusher member 32 acts synchronously against the outlet valve 30¹ and urges it in the direction of the jack, as illustrated in Fig. 15.

Thus, the valves are controlled synchronously with the operation of the piston and this allows increasing considerably the speed and the output of the pump, whereas this is impossible in all the known pump arrangements in which no fluid is delivered beyond a predetermined comparatively reduced speed. It is therefore apparent that this improvement is very important.

Figure 16:
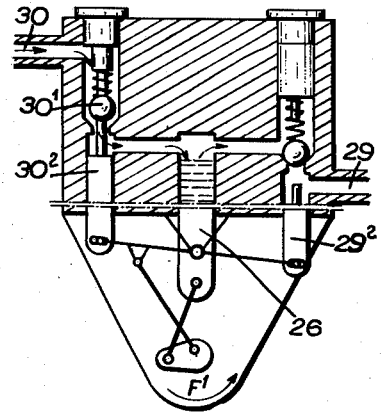

On the other hand, I wish to emphasize the part played by the two pusher members 29² and 30² and in particular the important part played by the pusher member 30² on the delivery side in the case of pumps controlling lifting jacks. As a matter of fact, if the pump is driven in a direction opposed to the preceding direction, i. e. in the direction of the arrow F¹ in Fig. 16, the delivery or outlet valve 30¹ is raised when the piston 26 sinks inside the cylinder during the suction stage thereof. Consequently, the liquid passes from the jack into the pump cylinder and thence it is delivered during the following fraction of the rotation of the crankshaft into the oil container through the pipe 29 the valve 29¹ of which is raised at the proper moment.

The downward movement can, therefore, be executed only at the speed allowed by the motor which brakes the said downward movement, whatever load may be carried by the package or goods lifting carrier. This is essential and ensures a gradual downward movement of the loads without any risk of ever racing while it allows handling with care brittle loads.

Obviously, and as already apparent from the preceding disclosure, my invention is by no means limited to the applications and embodiments of its various parts which have been more particulary described and it covers all the modifications thereof falling within the scope of accompanying claims.

What I claim is:

1. In an industrial lift truck having a bodily shiftable lift mechanism, in combination: a frame supported by a rear power directing and driving rear wheel-train section and having a U-shaped front section comprising two spaced parallel side rails forming an unobstructed median space; a supporting wheel under the forward end of each said side rails; on each side of said median space, adjacent to and parallel with said side rails, a lower guide ramp pivotably mounted and articulated on said frame and extending forward of said supporting wheel, and an upper guide ramp fixedly attached to the rear of said rear section, said upper ramp being located directly above said lower ramp and having a forward portion substantially parallel with said side rails and a rear portion sloping rearwardly and downwardly, the front end of said forward portion being located at a point intermediate between said rear section and said supporting wheel; a shiftable lift system comprising load carrying means and two guiding uprights for said load carrying means at the rear thereof; in each of said uprights, a first supporting roller engaging said lower ramp and a second guiding roller disposed at a distance rearward of said upright and engaging said upper ramp; means to shift said uprights between the rear and the front ends of said lower ramps; a ground engaging prop rigid with the forward end of each of said lower pivotable ramps; said uprights and said lower ramps being adapted to cooperate in such manner that when said uprights are shifted to the front end of said lower ramps, the latter end pivots automatically downwards, and said props engage the ground automatically and relieve said supporting wheels from the weight of the load and prevent the toppling of the truck during loading; and when said uprights are shifted to the rear end of said lower ramps, in the load transporting position, said uprights engage said rear end to cause automatically the upward pivoting of the front end of the lower ramps and the automatic release of the props from the ground, thereby allowing the truck to be moved.

2. An industrial lift truck as claimed in claim 1, in which said upper ramp and said second guiding rollers are adapted to cooperate so that, as said second guiding rollers engage the rear portion of said upper ramp, said uprights are tilted backwards at a small angle from the vertical in the load transporting position.

3. In an industrial lift truck having a bodily shiftable lift mechanism, in combination: a frame including a rear power and driving section and a U-shaped front section comprising two spaced parallel side rails forming an unobstructed median space; a supporting wheel under the forward end of each said side rails; on each side of said median space, adjacent to and parallel with said side rails, a lower guide ramp pivotably mounted on said frame and extending forward of said supporting wheel, and an upper guide ramp fixedly attached to the rear of said rear section; said upper ramp being located directly above said lower ramp and having a forward portion substantially parallel with said side rails and a rear portion sloping rearwardly and downwardly, the front end of said forward portion being located at a point intermediate between said rear section and said supporting wheel; a shiftable lift system comprising load carrying means and two guiding uprights for said load carrying means at the rear thereof; in each of said uprights, a first supporting roller engaging said lower ramp and a second guiding roller disposed at a distance rearward of said upright and engaging said upper ramp; means to shift said uprights between the rear and the front ends of said lower ramps; a prop rigid in such manner that when said uprights are shifted to the front end of said lower ramps, the latter pivot downwards, and said props engage the ground and relieve said supporting wheels from the weight of the load; and when said uprights are shifted to the rear end of said lower ramps, with the forward end of said lower pivotable ramp; said uprights and said lower ramps being adapted to cooperate in the load transporting position, said uprights engage said rear end to cause the upward pivoting of the front end of said lower ramps and the release of the props from the ground, thereby allowing the truck to be moved; driving means to control the movement of the truck; locking means to prevent operation of said driving means; and releasing means for said locking means, said releasing means being acted upon, to release said locking means, by said lift system when the latter is shifted rearwardly to its rear position relative to said upper and lower guide ramps, whereby said truck can be moved only when said lift system is in the rearward load transporting position.

4. An industrial lift truck as claimed in claim 3, in which said lift system comprises a jack rigid with said upright and including a telescopically moving upper section, pulleys carried respectively by said uprights, at the lower and upper ends thereof, by the jack and by the head of the telescopic upper section of the jack, and a cable guided by said pulleys and connecting said upper telescopic section of the jack with said load carrying means.

5. An industrial lift truck as claimed in claim 4, further comprising: an oil pump associated with the jack for controlling the motion of the upper telescopic section of the jack, oil inlet and outlet pipes connected with said pump, a valve in each said pipes, each valve having a seat, and pusher members controlled by the pump and constructed and adapted to urge the valves away from their seats in synchronism with the operation of said valves by the flow of oil.

6. An industrial lift truck as claimed in claim 4, in which said uprights are vertical, said telescopic upper section of the jack is adapted to guide the load carrying means, said cable being so disposed that a rise of the head of the jack first raises said load carrying means and when the latter hits the top of said telescopic upper section said cable lifts said load carrying means with said telescopic section, whereby said truck is adapted to stack in low ceiling spaces.

7. An industrial lift truck as claimed in claim 4, further comprising: an oil pump associated with the jack and controlling the motion of the upper telescopic section of the jack, an outlet oil pipe connecting said pump to said jack, an inlet oil pipe connecting said pump to an oil supply tank, a piston in said pump, in said pump a valve connected to each of said pipes, each valve having a seat and a spring pushing said valve against said seat in the position in which said valve prevents the afflux of oil in said pipe; and pusher members controlled by the motion of the piston of the pump, and constructed and adapted to urge the valves away from their seats in synchronism with the operation of said piston, thereby permitting the fast flow of the oil from said tank to said jack; said pump being furthermore adapted to allow the inversion of the direction of flow of the oil from the jack back to the tank, through said pump, said inversion being adapted to brake the downward motion of the jack.

References Cited in the file of this patent

UNITED STATES PATENTS

| | | |
|---|---|---|
| 2,126,289 | Schroeder | Aug. 9, 1938 |
| 2,366,378 | Barrett | Jan. 2, 1945 |
| 2,621,811 | Lull | Dec. 16, 1952 |
| 2,667,985 | Woughter | Feb. 2, 1954 |

FOREIGN PATENTS

| | | |
|---|---|---|
| 1,066,492 | France | Jan. 20, 1954 |